UNITED STATES PATENT OFFICE.

ROBERT WILHELM STREHLENERT, OF GOTTENBORG, SWEDEN.

PROCESS FOR THE PRODUCTION OF VALUABLE ORGANIC AND INORGANIC SUBSTANCES FROM WASTE SULFITE LIQUOR.

1,361,506.

Specification of Letters Patent.   Patented Dec. 7, 1920.

No Drawing.   Application filed May 10, 1917. Serial No. 167,838.

*To all whom it may concern:*

Be it known that I, ROBERT WILHELM STREHLENERT, a subject of the King of Norway, residing at Gottenborg, Sweden, have invented certain new and useful Improvements in Processes for the Production of Valuable Organic and Inorganic Substances from Waste Sulfite Liquor; and I do hereby declare the following to be a full, clear, and exact description of the invention, such as will enable others skilled in the art to which it appertains to make and use the same.

My invention relates to the treatment of the waste liquors of sulfite cellulose factories for the purpose of separating the organic and inorganic constituents of the same.

A process for this purpose has been described in my United States Patent No. 1,149,420, according to which the sulfurous acid content of the liquor is transformed into sulfuric acid, whereby the calcium-lignosulfite is decomposed and precipitated, the process being carried out under high pressure and high temperature, preferably by introducing air into the reaction vessel in order to raise the pressure and to secure oxidation.

It is a fact, however, that the sulfite process is now carried out in several ways, so that the waste liquor is of varying composition or quality, and often contains a very small quantity of free sulfurous acid. It is then difficult to obtain the necessary quantity of sulfuric acid for starting the reaction above mentioned. Sometimes the liquor is also first used for the production of alcohol, and in such cases there will be no free sulfurous acid at all in the liquor. It is then necessary to add a small quantity of sulfuric acid, for instance 0.1.–0.5% for starting the process.

My present invention relates to a special manner of obtaining this addition of sulfuric acid. According to my invention the addition of the sulfuric acid to the waste liquor is accomplished by the formation of the acid in the reaction vessel. The acid is formed therein by introducing gases or vapors containing $SO_2$ into the vessel in such manner that the necessary pressure is maintained. These gases or vapors of acid character are for instance the gases in a sulfite digester at the moment when it is to be blown off for lowering the pressure. In the preferred way of carrying out my invention I introduce such gases into the autoclave used for decomposition of the waste liquor under a pressure corresponding to about one atmosphere above normal pressure. The liquor is thereafter raised to the necessary temperature in any suitable manner, whereupon the gas introduced will expand and raise the pressure in the autoclave above the steam pressure which would prevail at the same temperature. When the liquor has reached the necessary temperature, usually about 190° to 200° centigrade, the sulfurous acid present will instantly be transformed by self-oxidation into sulfuric acid and free sulfur. The sulfuric acid thus formed completes the reaction in the liquor in the usual manner.

The transforming of $SO_2$ to sulfuric anhydrid just mentioned according to the equation:

$$3SO_2 = 2SO_3 + S$$

is known for instance from Gärtner and Berthelot's publications and has also been studied by Professor P. Klason in connection with the experiments relating to the properties of the sulfite liquor. This reaction seems, however, to have been studied only at lower temperatures (between 135–140° centigrade). To transform sulfurous acid to sulfuric acid according to the above equation at these temperatures would require from eight to ten hours. On such basis it would be impracticable to carry out the process on an industrial scale as the cost would be excessive. I have discovered that by employing a relatively high temperature preferably of about 190° C. and a pressure of about 20 atmospheres the reaction is instantaneous whereby the above mentioned difficulty is overcome.

I have found that with the above named gases, not only the sulfurous acid is operative in the decomposition of the calcium-lignosulfite, but that also such acids as formic acid, acetic acid and other acid organic compounds present in the gases take active part in the process. If such acids are present mixed with sulfurous acid, only small quantities of the latter acid is necessary to make the waste liquor rich enough in acid to secure decomposition.

It is evident that instead of gases obtained from the cellulose process, gases or vapors produced in other processes but containing these compounds of acid character may be used for carrying out the process.

When carrying out the present invention, the process as a whole may be performed substantially in the same way as described in my said prior patent. As soon as the necessary temperature and pressure have been reached, a matter of a few minutes when suitable apparatus is employed, the lignosulfite compounds are decomposed into lignin substance and inorganic metal salts, $SO_2$ and other gases being liberated from the lignosulfite compounds.

When the process is carried out in a continuous way, there being used a number of autoclaves, the quantity of sulfurous acid necessary can be reduced by transferring the liberated $SO_2$ from one autoclave to another. Furthermore, if the colloidal sulfur which is liberated by the decomposition is sublimed with the gases and exposed to an increase in temperature of 50° centigrade in the presence of air, it will burn and form an equivalent quantity of sulfurous acid. The air necessary for this purpose may be introduced into the autoclave where it is mixed with the $SO_2$ and the vaporized sulfur and afterward causes the oxidation of the sulfur, when the gas is being heated as mentioned. The small quantities of calcium and sodium sulfites present in the liquor are converted to sulfates and sulfids. The sulfids are further acted upon by the sulfuric acid formed during the process and hydrogen sulfid is liberated. The latter reacts with the $SO_2$ to form colloidal sulfur.

As will be understood from the above description it is necessary to add $SO_2$ only upon starting the first autoclave as during the decomposition of the liquor more or less $SO_2$ is formed, which is then utilized for the next autoclave. Furthermore, considerable quantities of $SO_2$ may be recovered in this way and utilized in the sulfite process.

If it is desired to obtain a still stronger acid mixture, thereby intensifying the action, this may be brought about by adding to the gases obtained from the digesters a suitable oxidizing agent such as atmospheric oxygen.

The foregoing detailed description has been given for clearness of understanding and no undue limitation should be deduced therefrom, but the appended claims should be construed as broadly as permissible in view of the prior art.

What I claim as new and desire to secure by Letters Patent of the United States is:

1. In a process for the production of valuable organic and inorganic substances from waste liquor from the sulfite cellulose process, the step which consists in introducing into an autoclave, containing the said waste liquor, gases or vapors of an acid character in a quantity sufficient to create a pressure which is considerably higher than the steam pressure corresponding to the temperature in the autoclave, said temperature and pressure being sufficient to cause the self-oxidation of sulfurous acid.

2. In a process for the production of valuable organic and inorganic substances from waste liquor from the sulfite cellulose process, the step which consists in introducing into an autoclave, containing the said waste liquor, waste gases or vapors from a sulfite cellulose digester in a quantity sufficient to create a pressure which is considerably higher than the steam pressure corresponding to the temperature in the autoclave, said temperature and pressure being sufficient to cause the self-oxidation of sulfurous acid.

3. The process for the production of valuable organic and inorganic substances from waste liquor from the sulfite cellulose process, which comprises introducing gases or vapors of an acid character into an autoclave containing the said waste liquor, increasing the temperature and pressure whereby the $SO_2$ present in the autoclave is converted into sulfuric acid and free sulfur and decomposition of the liquor is effected, transferring thereafter gas containing free sulfur from the autoclave to a container where it is heated in the presence of air to oxidize the free sulfur to $SO_2$, and utilizing the said gas for the decomposition of another charge of waste liquor.

4. The process for the production of valuable organic and inorganic substances from waste liquor from the sulfite cellulose process, which comprises, introducing gases or vapors of an acid character and an oxidizing agent under pressure into an autoclave containing the waste liquor, increasing the temperature and pressure whereby the $SO_2$ present is transformed into sulfuric acid and free sulfur, thereby causing decomposition of the liquor, transferring the said $SO_2$ and free sulfur to a container where it is heated in the presence of air, so as to cause an oxidation of the free sulfur to $SO_2$, and utilizing the said $SO_2$ for the decomposition of another charge of liquor.

5. The process for the production of valuable organic and inorganic substances from waste liquor from the sulfite cellulose process, which comprises introducing gases or vapors of an acid character together with air under pressure into an autoclave containing the waste liquor, increasing the temperature and pressure whereby the $SO_2$ present is transformed into sulfuric acid and free sulfur, thereby causing decomposition of the liquor, transferring the $SO_2$ thus liberated and the free sulfur to a container where they are heated in the presence of air, so as to cause an oxidation of the free sulfur to $SO_2$, and utilizing the said $SO_2$ for the decomposition of another charge of liquor.

6. The process for the recovery of valuable organic and inorganic substances from waste liquor from the sulfite cellulose process, which comprises introducing a gas containing $SO_2$ into an autoclave containing said waste liquor, raising the temperature and pressure until a part of the resultant sulfurous acid is decomposed forming sulfur and sulfuric acid, said sulfuric acid reacting upon and decomposing the waste liquor thereby precipitating the organic constituents and calcium sulfate, separating the precipitate from the liquid, and leading the gas from the said autoclave to another autoclave for decomposition of waste liquor.

7. The process for the recovery of valuable organic and inorganic substances from waste liquor from the sulfite cellulose process, which comprises introducing a gas containing $SO_2$ into an autoclave containing said waste liquor, raising the temperature and pressure until a part of the resultant sulfurous acid is decomposed forming sulfur and sulfuric acid, said sulfuric acid reacting upon and decomposing the waste liquor thereby precipitating the organic constituents and calcium sulfate, separating the precipitate from the liquid, leading the gas containing sulfur dioxid and sulfur from the said autoclave to a container, mixing it with a gas comprising oxygen, raising the temperature of the mixture until the sulfur is oxidized to $SO_2$, and leading the gas to another autoclave for decomposition of waste liquor.

8. The process, which comprises subjecting waste sulfite liquor to the action of an acid gas at a temperature and pressure sufficient to cause the rapid self-oxidation of the $SO_2$ liberated from said liquor.

9. The process which comprises subjecting waste sulfite liquor containing but little or no free sulfurous acid, which comprises subjecting the liquor to the action of acid gases containing $SO_2$ at a temperature and pressure sufficient to cause the rapid self-oxidation of the resultant sulfurous acid.

10. The process, which comprises subjecting waste sulfite liquor to the action of an acid gas at a temperature and pressure sufficient to cause the rapid self-oxidation of the $SO_2$ liberated from said liquor, and oxidizing the resulting sulfur.

11. The process, which comprises subjecting waste sulfite liquor to the action of acid gases in the presence of $SO_2$ and oxygen, first at a temperature and pressure sufficient to cause the rapid self-oxidation of $SO_2$ with the simultaneous liberation of sulfur, and thereafter changing the temperature conditions to cause the oxidation of the sulfur to sulfur dioxid.

12. The process, which comprises subjecting waste sulfite liquor to the action of an acid gas at a temperature of about 190°–200° C., and a pressure of about 20 atmospheres.

13. The process which comprises subjecting waste sulfite liquor to the action of $SO_2$ at a temperature of about 190° to 200° C. and a pressure of about 20 atmospheres.

ROBERT WILHELM STREHLENERT.

Witness:
C. DORMAN.